April 21, 1925.

LE GRAND G. CAREY 1,534,297

TRACTOR VEHICLE

Filed Dec. 22, 1921   4 Sheets-Sheet 1

April 21, 1925.  LE GRAND G. CAREY  1,534,297

TRACTOR VEHICLE

Filed Dec. 22, 1921   4 Sheets-Sheet 2

April 21, 1925.

LE GRAND G. CAREY 1,534,297

TRACTOR VEHICLE

Filed Dec. 22, 1921   4 Sheets-Sheet 3

INVENTOR
Le Grand G. Carey.
BY
Baker Macklin,
ATTORNEYS

April 21, 1925.  
LE GRAND G. CAREY  
TRACTOR VEHICLE  
Filed Dec. 22, 1921  
4 Sheets-Sheet 4  
1,534,297

INVENTOR  
Le Grand G. Carey  
By Baker & Macklin  
ATTORNEYS

Patented Apr. 21, 1925.

1,534,297

UNITED STATES PATENT OFFICE.

LE GRAND G. CAREY, OF CLEVELAND, OHIO.

TRACTOR VEHICLE.

Application filed December 22, 1921. Serial No. 524,230.

*To all whom it may concern:*

Be it known that I, LE GRAND G. CAREY, a citizen of the United States, residing at Cleveland, in the county of Cuyahoga and State of Ohio, have invented a certain new and useful Improvement in Tractor Vehicles, of which the following is a full, clear, and exact description, reference being had to the accompanying drawings.

This invention relates to improvements in dump wagons and is more particularly concerned with vehicles such as are in use in large grading and excavating projects.

The general object of the present invention is the provision of a dump wagon of large capacity having tractor propelling means.

A further object is the provision of a small, compact durable tractor construction having unique characteristics of design which will permit of its ready adaptation to the hauling of a large dump wagon of the bottom dumping type; the design of the tractor being such that the crawlers or grouser aprons may be selectively driven by suitable reduction gearing which is propelled by an internal combustion engine positioned on the tractor frame.

Another object is to arrange all of the mechanism carried by the tractor frame in such a manner as to permit the turning of the tractor and the vehicle in a relatively small space.

An additional important object is the provision of means operable upon a movement of the tractor which is adapted to close the dumping doors of the vehicle consequent to the unloading of the vehicle.

Other objects will become apparent from the following description in reference to the accompanying drawings which illustrate an embodiment of my device: the essential characteristics are summarized in the claims.

Figure 1:
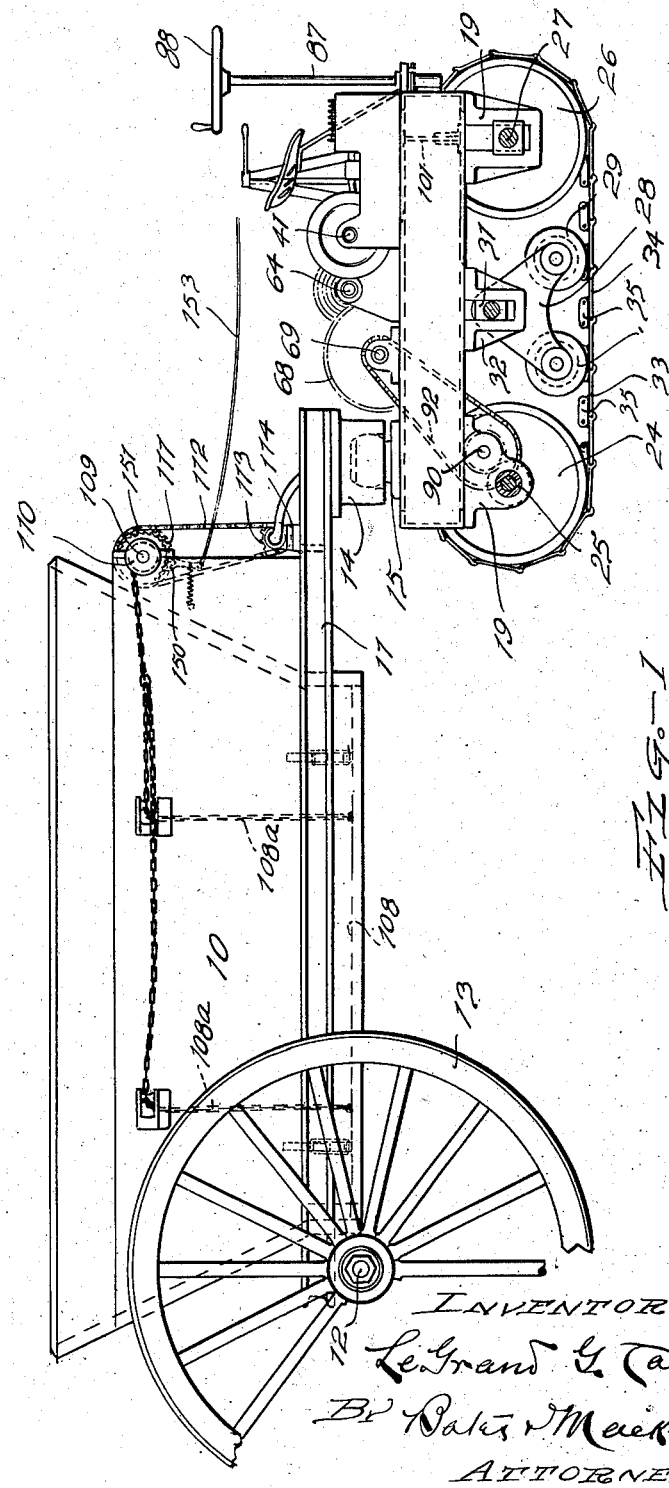
Figure 2:
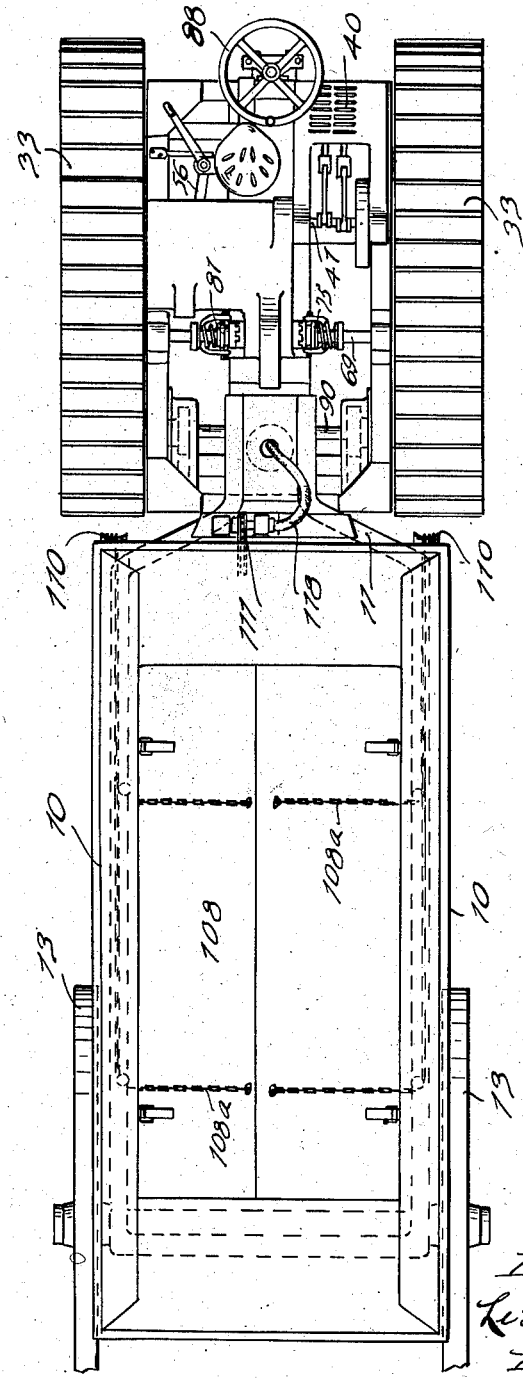
Figure 3:
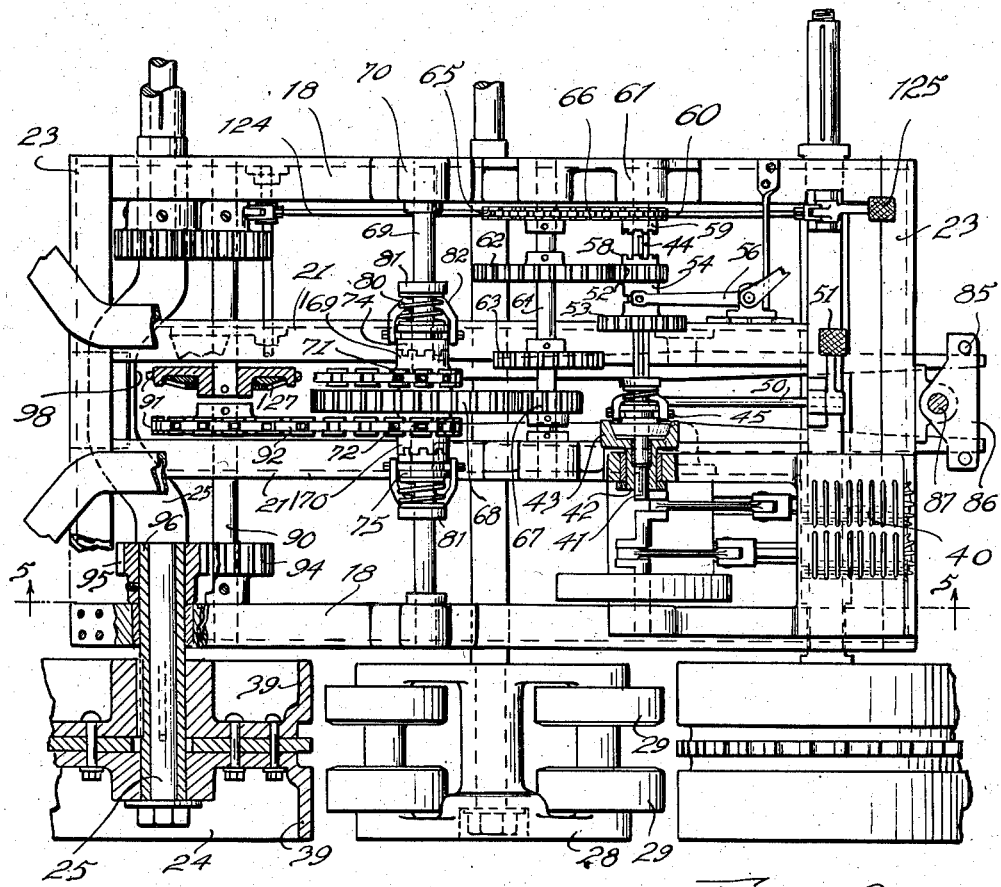
Figure 4:
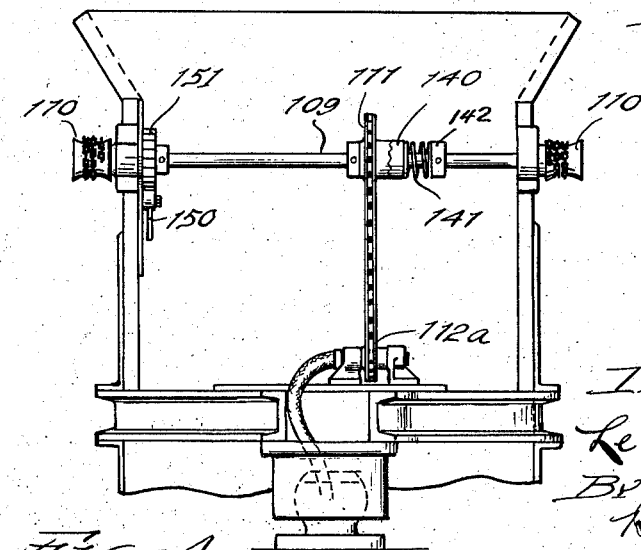
Figure 5:
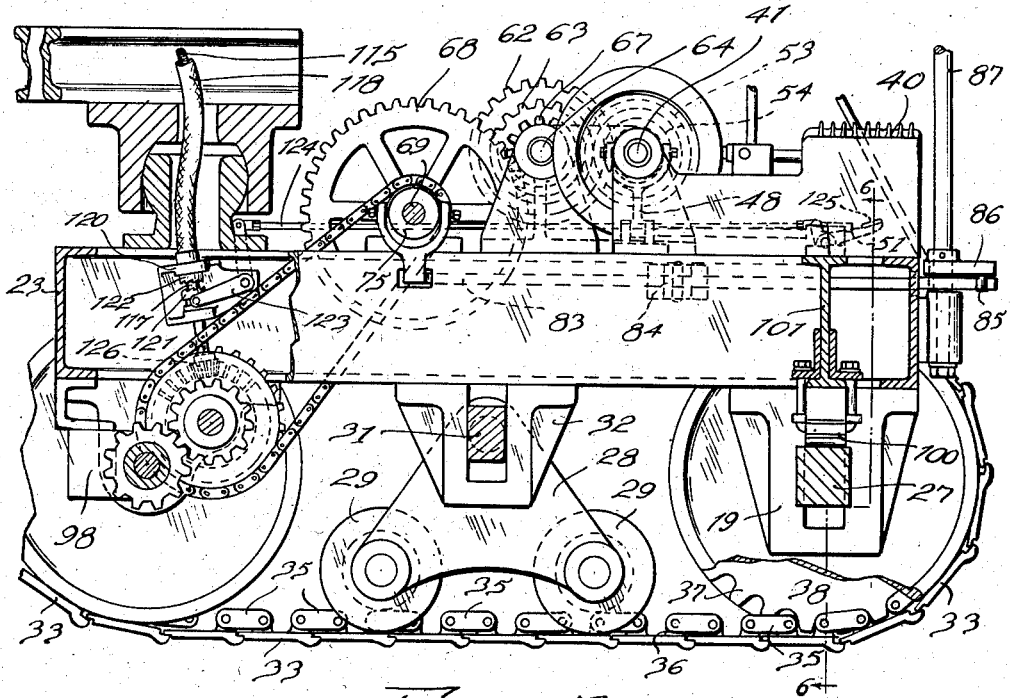
Figure 6:
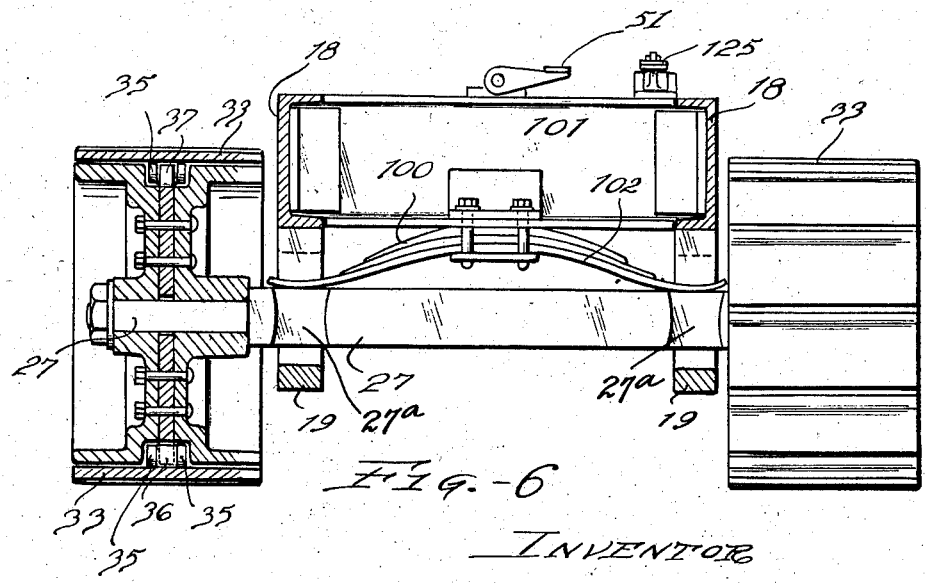

In the drawings Fig. 1 is a side elevation of a dump cart and tractor which illustrates the relative proportions of the load carrying body of the vehicle and the propelling mechanism or tractor; Fig. 2 is a plan view of the vehicle; Fig. 3 is an enlarged plan view of the reduction gearing and tractor propelling mechanism with one of the propelling wheels and some of the bearing in cross section; Fig. 4 is a fragmentary front elevation illustrating a rewind mechanism for closing the unloading doors; Fig. 5 is a longitudinal cross sectional elevation of the tractor and pivotal connecting means for connecting the load carrying body to the tractor; Fig. 6 is a transverse sectional elevation taken substantially through the front axle of the tractor.

In heavy grading work where the earth is soft, it is customary to use horse-drawn dump wagons having a comparatively small load carrying capacity, usually not exceeding a cubic yard. The wagons are usually loaded by a so-called steam shovel or surface grading machine, the effective utilization of which is limited, due to the fact that continuous operation is interrupted whenever one wagon is drawn away while another is positioned adjacent the machine. To eliminate this loss of time as well as to greatly lower the cost of grading work in general I have provided a tractor drawn vehicle of large capacity which may be readily maneuvered into position with the same degree of ease as a smaller vehicle drawn by horses.

The general requirements of such a vehicle are that it should be several times the capacity of a small wagon; that it should be of the bottom unloading or bottom dumping type, and that the means for propelling it should be of sufficient power to haul the load over yielding ground surfaces; the propelling means, however, should be of such size that the vehicle may be turned within a comparatively small space.

In Fig. 1 I have illustrated a design embodying these characteristics wherein a dump wagon having an unusually large load carrying body 10 is supported by longitudinally extending beams 11, the rearward ends of which are secured to a heavy axle 12 upon which a pair of wide rimmed wheels 13 are mounted. The forward ends of the beams may be secured to a pivot block 14 which rests upon a complementary engaging block 15 positioned at the rearward end of the tractor frame.

The tractor construction is comprised of a rectangular structural frame having longitudinal side members 18 upon which depending tractor wheel bearings 19 are mounted and two intermediate longitudinal members 21 which are arranged to support the various gearing and control mechanisms hereinafter referred to. Transverse end members 23 complete the tractor frame.

The rear wheels 24 serve to drive the vehicle and may be mounted on a non-rotatable axle member 25 while the forward wheels 26 may be positioned on the outer ends of a resiliently mounted axle 27. Positioned intermediate the forward and rearward wheels are rocker members 28. The rocker members may have a pair of stabilizing rollers 29 equidistantly positioned from the center thereof. A supporting axle 31 is arranged to carry the rocker members and is maintained in lateral relation to the tractor frame by bearing brackets 32 secured to and depending from the under side of the side frame members 18. The axle may have a centrally disposed pivotal connection with the frame which may be comprised of a bracket (not shown) secured to the underside of the intermediate longitudinal frame members 21. The arrangement of the supports and axle for the rollers 29 are described in my Patent No. 1,228,179, granted May 29, 1917.

The traction or crawler aprons 34 may be joined by link members 35 which are pivotally connected to the lugs 36, the lugs being rigidly formed on each apron flight adjacent the abutting edges thereof and centrally positioned. From Fig. 5 it will be apparent that the lugs 36 will be engaged by the teeth 37 of the sprocket members 38; the sprockets 38 being disposed between the flanged members 39 of the wheels 24 and 26.

A particular advantage of this arrangement is that open spaces are provided between each link to prevent accumulation of soil. The result is that the soil which may gather between the connecting links will be easily displaced by the sprocket teeth. I find that a very economical construction may thus be obtained without impairing the strength or propelling power of the mechanism.

The propelling mechanism may be comprised of a double cylinder gas engine 40; the crank shaft 41 may be directly connected to a sleeve 42 of a friction clutch member 43 coaxially arranged with a jack shaft 44. A cone member 45 may be slidably mounted on the jack shaft but in splined relation therewith so that it may be shifted into and out of engagement with the clutch member 43 by any suitable shipper means. Such means may comprise a bifurcated member 48 supported on the end of a longitudinal shaft 50 which extends in a forward direction to the driver's position on the tractor, while a suitable foot pedal 51 may be mounted on the outer end thereof.

I prefer to also mount sliding gears 52 and 53 upon the jack shaft 44 for the purpose of obtaining two driving speeds. The gears may be carried on a sleeve 54 in splined relation with the jack shaft; the sleeve being shifted along the shaft by a shipper lever 56 operated from the driver's position. The sleeve 54 may have one end notched to form a claw clutch member which is adapted to engage a similarly notched hub 59 of a sprocket member 60 also mounted on the jack shaft and adjacent the bearing member 61.

The gear 52 is adapted to engage a large gear 62 while the gear 53 is adapted to engage the gear 63, both of which are carried by an intermediate shaft 64. These gears thus afford two ranges of speed rotation for the intermediate shaft 64. A sprocket member 65 may also be mounted on the intermediate shaft 64 and be driven by a chain 66 meshing with the small sprocket 60. This arrangement provides a reverse drive for the intermediate shaft 64. A heavy pinion 67 is arranged near the inner end of the intermediate shaft and is adapted to drive a large gear 68 which is carried on a heavy shaft 69; the latter shaft may be supported on bearing members 70 secured to the upper face of the side frame members 18.

To turn the vehicle to the right or the left, I have provided selective means on the shaft 69 for driving either the right or the left tractor apron. This mechanism may be comprised of claw clutch members 169 and 170 which are loosely mounted on the shaft 69 but in rigid relation with sprockets 71 and 72 respectively. The clutch members 169 and 170 are arranged to be respectively engaged by the claw members 74 and 75 which are in splined relation with the shaft 69. Suitable spring members 80 may be disposed between the ends of the slidable claw members and collars 81 which are rigidly secured to the shaft.

To disengage these clutch members I have provided shipper members 82 which may extend downwardly and be rigid with shifting levers 83. The latter members may be pivotally mounted in suitable bearings 84 secured to the intermediate frame members 21. These levers may extend beyond the forward end of the machine and be engaged by pins 85 which are carried by a rocker member 86 rigidly mounted on a steering post 87. The steering post may extend upwardly to the driver's position and have a wheel 88 rigid therewith which is positioned in front of the driver's seat.

If it is desired to drive the vehicle straight ahead, both of the clutches on the shaft 69 should be in engagement, hence the rocker member 86 should be in the position illustrated in Fig. 3. If it is desired to disengage one of the members, the driver will first release the friction clutch members 43 and 45, after which either one of the claw clutches 169 or 170 may be disengaged by turning the steering wheel 88 to the right or the left. If it is desired to turn to the right, the clutch member 70 should be disengaged thus causing the mechanism to drive the left tractor apron while the right apron remains stationary, and vice versa.

The rear driving shaft 90 may be positioned beneath the longitudinal frame members and be supported by suitable bearings depending therefrom; this shaft may carry large sprockets 91 which may be driven by chains 92 and sprockets 71 and 72. The shaft 90 is arranged to drive the pinions 94 which are positioned thereon adjacent the frame members and which mesh with the spur-gears 95; the latter gears being in rigid relation with the driving sleeves 96 which are supported on the axle 25. These sleeves extend from the inner side of the outer frame members 18 to the ends of the axle and are arranged to drive the rear wheels 24. The axle 25 is rigidly supported on the tractor frame by suitable bracket members 98 which may be secured to the under side thereof.

I prefer to provide the forward axle with a transverse elliptic spring 100 which may be rigidly secured to the transverse frame member 101 at the center thereof. The spring member may extend downwardly to engage the upper face of the axle 27. To permit the axle to shift in a vertical direction, I have provided elongated openings in the bearing brackets 19, in which the axle may move vertically above and below the normal position shown. Suitable grooves 27ª may be formed in the sides of the axle in which the brackets 19 fit. The brackets thus serve to prevent transverse shifting of the axle. This arrangement permits either end of the axle to be depressed or raised independently of the other and permits movement of both ends of the axle at the same time as the contour of the ground may require.

As the driver is in position on the forward end of the tractor, it is important that means be provided for elevating the dumping doors 108 of the load carrying body 10, capable of being operated and controlled by the driver while in the driver's seat. To this end I have provided means for driving the shaft 109 upon which the chain drums 110 are mounted. To effect the driving of the shaft I have arranged a large sprocket 111 on the drum shaft which is driven by a chain 112 and a small sprocket 112ª which may be carried on a stud shaft mounted on a suitable bearing block 114 secured to the beams 11 of the body. The stud staft may be driven by a flexible shaft which extends downwardly through the pivotal center of the connecting blocks 14 and 15 of the vehicle to an angularly disposed small shaft 117. Suitable flexible covering 118 may serve to prevent the accumulation of dirt and grit upon the flexible shaft. This cover may terminate at and be secured to a bearing member 120 mounted on the tractor frame.

The bearing member 120 is arranged to support engaging and disengaging means for imparting motion to the flexible shaft comprising a small shaft 117, a bevel pinion 126 and a slidable saw-tooth clutch member 121 which is adapted to be shifted upwardly and into engagement with a complementary member 122, secured to the end of the flexible shaft 115. The shifting of the member 121 may be effected by bell crank 123 which is controlled from the driver's position by an outwardly extending rod 124. and foot lever 125. The bevel pinion 126 is driven by a bevel gear 127; the latter gear being mounted on the side of one of the sprocket members 91.

It is evident that with the foregoing described mechanism the closing of the doors 108 may be effected by the winding of the chains 108ª upon the drums when the clutch member 121 is lifted into engagement with the complementary clutch member 122 by the control mechanism terminating at the front of the machine in the foot pedal 125.

To prevent any straining of the various elements included in the door closing mechanism in case the operator should prolong pressure on the brake pedal 125, I have provided automatic releasing means on the drum shaft 109 and associated with the hub of the sprocket 111 which may be comprised of releasing member 140, which is slidably mounted on the drum shaft 109 but in splined engagement therewith. This member may have suitable notches maintained in engagement with complementary notches formed on the sprocket hub by a spring member 141. A collar 142 serves to maintain the spring under compression urging the member 140 into operative relation with its mate, rigid with the sprocket. The force of the spring is sufficient to maintain this relation during the door closing operation, but will permit the member 140 to slide out of driving engagement with the sprocket when the doors have been completely closed, preventing damaging parts.

When the vehicle is loaded, the dumping of the load may be effected by releasing a pawl 150 which is in engagement with a ratchet member 151 rigidly mounted on the drum shaft 109 and normally holding the dumping doors closed. The pawl may be pivotally mounted on one side of the body 10 and may be read'ly manipulated by any suitable means such as a cord 153 extending to the operator's position on the tractor. As the flexible shaft is not coupled with the driving means during this operation a reverse movement of the door closing mechanism will be effected.

From the foregoing description of my invention it is evident that I have provided a tractor propelled vehicle of the bottom dumping type wherein I have embodied features of tractor design which will permit of easy maneuvering of the vehicle over soft or rough ground including means operable from the driver's position on the tractor for controlling the various mechanisms for turning the vehicle to the right or left or to reverse it. Furthermore, I have provided a simple means for unloading the vehicle and for conditioning it for the reception of another load, all of which may be controlled by the driver without necessitating loss of time consequent to the driver leaving his position on the tractor.

Having thus described my invention, I claim:

1. The combination with a load carrying body having dumping doors, of a tractor supporting the forward end of the body, a pivotal connection between the body and the tractor, means for propelling the tractor, and mechanism actuated by said means for closing said dumping doors, said mechanism including a flexible connection extending from the vehicle body to the tractor and passing through the pivotal connection between the body and the tractor.

2. The combination with a load carrying body having a dumping door, of a propelling tractor pivotally supporting the forward end of the body, and means actuated by the tractor propelling means for closing said door, including a shaft driven by the tractor and extending through the pivotal connection between said tractor and said vehicle body.

3. The combination with a load carrying body, of a tractor mechanism for propelling the load carrying body constituting a support for the forward end of the load carrying body and pivotally connected therewith, said tractor mechanism having rear propeller wheels of less height than the height of said doors when closed, and pivotal connecting means between the body and tractor overhanging the rear driving wheels of the vehicle.

4. The combination of a vehicle having a load container provided with a dumping door, a pair of wheels and an axle supporting the rearward portion of said container, a tractor mechanism for propelling the vehicle and constituting a support for the forward end of the load container and pivotally connected therewith whereby the body overhangs the tractor frame, and vertically extending axle driven means positioned on the tractor frame and connected with said body for effecting the closing of said doors.

5. The combination of a vehicle body having a load dumping door, tractor propelling means therefor, and means actuated upon a movement of said tractor propelling means to effect the closing of said dumping doors, said means comprising a winding mechanism on the vehicle body including an overwind releasing clutch mounted on the vehicle body.

6. The combination with a load carrying body having a dumping door, of a propelling tractor pivotally connected with and supporting one end of said body, and means operable by the tractor upon movement thereof for closing said door, including a flexible shaft extending through the pivotal connection between the end of the body and tractor, said flexible shaft being selectively driven by the tractor propelling means.

7. In combination with a dump wagon, a tractor, power means propelling the rear axle of the tractor, a connecting means pivotally coupling the dump wagon to the tractor, said means being positioned immediately over the rear axle of the tractor, a power take-off extending through the coupling means and between the body of the wagon and the tractor rear axle including a power disengaging clutch mounted on the tractor and a normally engaged clutch mounted on the wagon, a dump door on the wagon, a winding shaft provided with flexible means for closing the door and means for yieldingly maintaining the normally engaged clutch in driving relation with said shaft whereby an excess application of power to the shaft will cause a disengagement of the clutch.

8. In combination, a dump body provided with means for closing a door in the body including a chain winding shaft, a tractor pivotally connected to the dump body and means driven by the tractor for driving the chain shaft, said means extending through the pivotal connection between the body and the tractor and including a clutch on the tractor and a clutch on the body.

In testimony whereof I hereunto affix my signature.

LE GRAND G. CAREY.